US008015055B2

(12) United States Patent
Makita et al.

(10) Patent No.: US 8,015,055 B2
(45) Date of Patent: Sep. 6, 2011

(54) COMPUTER PROGRAM FOR SUPPORTING EVALUATION OF A SERVICE

(75) Inventors: Kosato Makita, Fujisawa (JP); Fusashi Nakamura, Tokyo (JP); Yuriko Sawatani, Tokyo (JP); Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 11/608,051

(22) Filed: Dec. 7, 2006

(65) Prior Publication Data

US 2007/0150324 A1   Jun. 28, 2007

(30) Foreign Application Priority Data

Dec. 28, 2005   (JP) ................................ 2005-379996

(51) Int. Cl.
  *G06Q 10/00*   (2006.01)
(52) U.S. Cl. ..................... 705/7.38; 705/7.11; 705/7.28; 705/7.29; 714/39; 714/47.1; 714/48
(58) Field of Classification Search .................. None
  See application file for complete search history.

(56) References Cited

U.S. PATENT DOCUMENTS

| | | | | |
|---|---|---|---|---|
| 5,402,333 A * | 3/1995 | Cardner | ........................... | 700/31 |
| 5,586,252 A * | 12/1996 | Barnard et al. | ................. | 714/48 |
| 6,523,027 B1 * | 2/2003 | Underwood | ........................... | 1/1 |
| 6,536,037 B1 * | 3/2003 | Guheen et al. | ................. | 717/151 |
| 6,574,605 B1 * | 6/2003 | Sanders et al. | ..................... | 705/8 |
| 6,601,233 B1 * | 7/2003 | Underwood | .................. | 717/102 |
| 6,606,744 B1 * | 8/2003 | Mikurak | ........................ | 717/174 |
| 6,917,846 B1 * | 7/2005 | Muller | ........................... | 700/108 |
| 7,020,621 B1 * | 3/2006 | Feria et al. | ........................ | 705/10 |

(Continued)

FOREIGN PATENT DOCUMENTS

JP     2001265908        9/2001

OTHER PUBLICATIONS

Christian Gheorghe. (May 2006). Predictive Analytics: BPM Drives the Dynamic Organization. Business Performance Management Magazine, 4(2), 21-23.*

(Continued)

*Primary Examiner* — Romain Jeanty
*Assistant Examiner* — Gurkanwaljit Singh
(74) *Attorney, Agent, or Firm* — Yee & Associates, P.C.; Tom Tyson

(57) ABSTRACT

A method and system for determining a variable compensation amount according to the degree of achievement by avoiding stop at the stage where value brought about to a client by a solution is qualitatively evaluated, avoiding compensation calculation from being performed by accumulation of cost such as labor cost, and quantitatively estimating the effect from the viewpoint of a set KPI in consideration of risk to achievement of the KPI. There is provided a system for supporting advance evaluation of a service for improving business, comprising: input means for accepting selection of an index indicating the degree of improvement of the business and accepting setting of multiple future scenarios which influences success/failure of the improvement of the business; storage means for storing the index and the multiple scenarios; and calculation means for calculating a primary estimate value of the index in the case of occurrence of each scenario and calculating a secondary estimate value based on the primary estimate value and a primary risk corresponding to the primary estimate value.

8 Claims, 10 Drawing Sheets

U.S. PATENT DOCUMENTS

| | | | | |
|---|---|---|---|---|
| 7,076,695 | B2 * | 7/2006 | McGee et al. | 714/47 |
| 7,124,101 | B1 * | 10/2006 | Mikurak | 705/35 |
| 7,266,520 | B1 * | 9/2007 | Herbst et al. | 705/35 |
| 2001/0051913 | A1 * | 12/2001 | Vashistha et al. | 705/37 |
| 2001/0052108 | A1 * | 12/2001 | Bowman-Amuah | 717/1 |
| 2002/0035495 | A1 * | 3/2002 | Spira et al. | 705/7 |
| 2002/0099578 | A1 * | 7/2002 | Eicher et al. | 705/7 |
| 2002/0099580 | A1 * | 7/2002 | Eicher et al. | 705/7 |
| 2002/0099598 | A1 * | 7/2002 | Eicher et al. | 705/11 |
| 2002/0156666 | A1 * | 10/2002 | Taylor et al. | 705/7 |
| 2002/0161600 | A1 * | 10/2002 | Stubiger et al. | 705/1 |
| 2002/0161614 | A1 * | 10/2002 | Spira et al. | 705/7 |
| 2002/0194113 | A1 * | 12/2002 | Lof et al. | 705/37 |
| 2003/0018576 | A1 * | 1/2003 | Zuckerbrot et al. | 705/38 |
| 2003/0079160 | A1 * | 4/2003 | McGee et al. | 714/39 |
| 2003/0110065 | A1 * | 6/2003 | Twigge-Molecey | 705/7 |
| 2003/0120593 | A1 * | 6/2003 | Bansal et al. | 705/39 |
| 2003/0135399 | A1 * | 7/2003 | Ahamparam et al. | 705/7 |
| 2003/0172002 | A1 * | 9/2003 | Spira et al. | 705/27 |
| 2004/0039619 | A1 * | 2/2004 | Zarb | 705/7 |
| 2004/0064351 | A1 * | 4/2004 | Mikurak | 705/7 |
| 2004/0068431 | A1 * | 4/2004 | Smith et al. | 705/10 |
| 2004/0098358 | A1 * | 5/2004 | Roediger | 706/46 |
| 2004/0102982 | A1 * | 5/2004 | Reid et al. | 705/1 |
| 2004/0107125 | A1 * | 6/2004 | Guheen et al. | 705/7 |
| 2005/0027661 | A1 * | 2/2005 | Lober et al. | 705/400 |
| 2005/0043976 | A1 * | 2/2005 | Leehman | 705/7 |
| 2005/0080698 | A1 * | 4/2005 | Perg et al. | 705/35 |
| 2005/0108084 | A1 * | 5/2005 | Ramamoorti et al. | 705/10 |
| 2005/0144067 | A1 * | 6/2005 | Farahat et al. | 705/14 |
| 2006/0161456 | A1 * | 7/2006 | Baker et al. | 705/2 |
| 2006/0241954 | A1 * | 10/2006 | Jeng et al. | 705/1 |

OTHER PUBLICATIONS

Jennifer Cannell. (Apr. 2006). Utilizing Dashboards for Performance Management. Credit & Financial Management Review, 12(2), 33-40.*

Maqsood A Sandhu, & A Gunasekaran. (2004). Business process development in project-based industry: A case study. Business Process Management Journal, 10(6), 673-690.*

Verena Dziobaka-Spitzhorn. (2006). From West to East: How the World's Third Largest Retailer Drives Its Global Expansion. Performance Improvement, 45(6), 41-48.*

Walden, Mark. (1996). How to evaluate and improve a forecasting process. The Journal of Business Forecasting Methods & Systems, 15(2), 22.*

Konrad Saur. (Dec. 2003). Life Cycle Management as a Business Strategy for Sustainability. Environmental Progress, 22(4), 237-240.*

Jinhong Xie, X Michael Song, Marvin Sirbu, & Qiong Wang. (1997). Kalman Filter estimation of new product diffusion models. JMR, Journal of Marketing Research, 34(3), 378-393.*

Robert Fildes. (1983). An Evaluation of Bayesian Forecasting :ABSTRACT. Journal of Forecasting (pre-1986), 2(2), 137.*

Pan, Rong (2002). Statistical process adjustment methods for quality control in short-run manufacturing. Ph.D. dissertation, The Pennsylvania State University, United States—Pennsylvania.*

Deng, Yan K. Cathey (2002). Monitoring process and assessing uncertainty for ANFIS time series forecasting. Ph.D. dissertation, West Virginia University, United States—West Virginia.*

Rajendra P. Srivastava, & Liping Liu. (2003). Applications of Belief Functions in Business Decisions: A Review. Information Systems Frontiers: Special Issue: Business Applications of Uncertain Reasoning, 5(4), 359-378.*

* cited by examiner

[Figure 1]
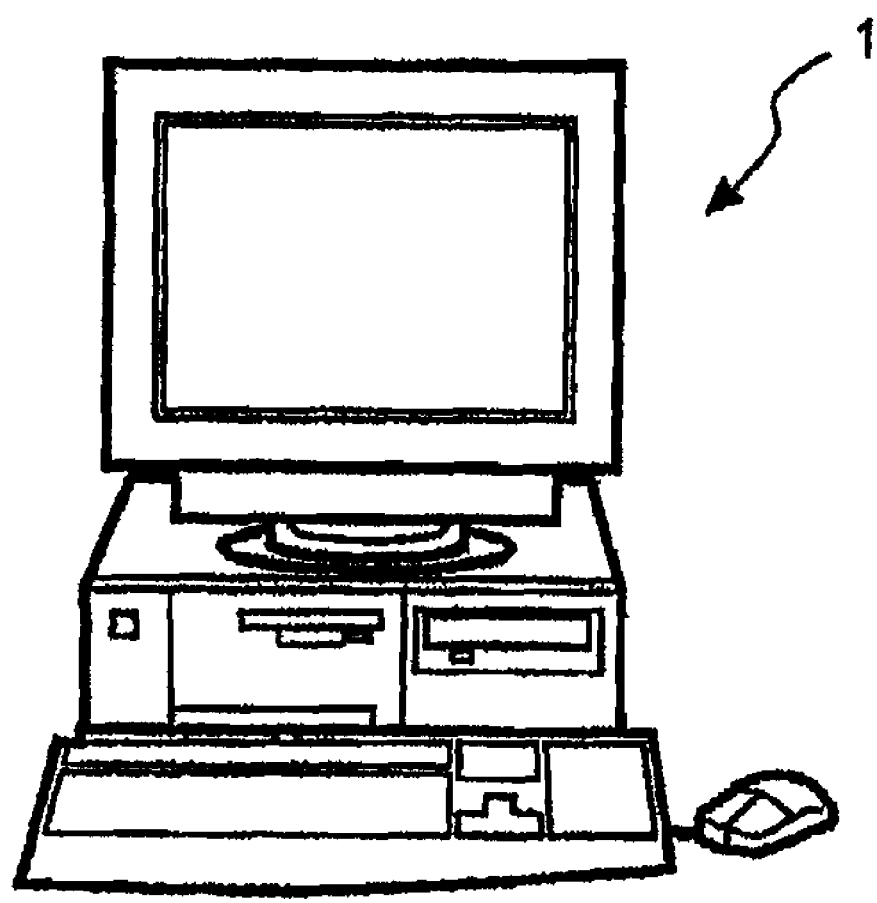

[Figure 2]
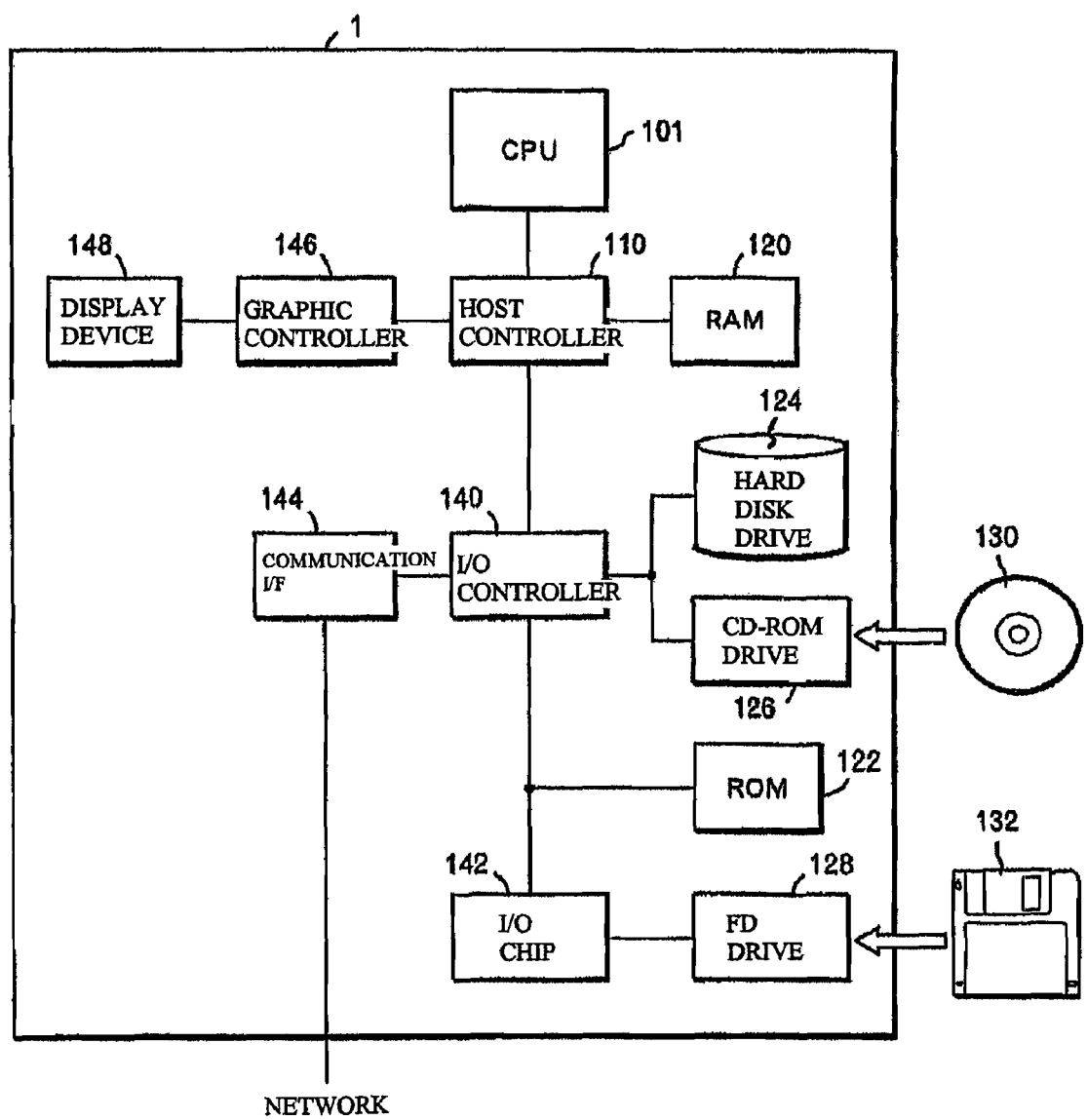

[Figure 3]
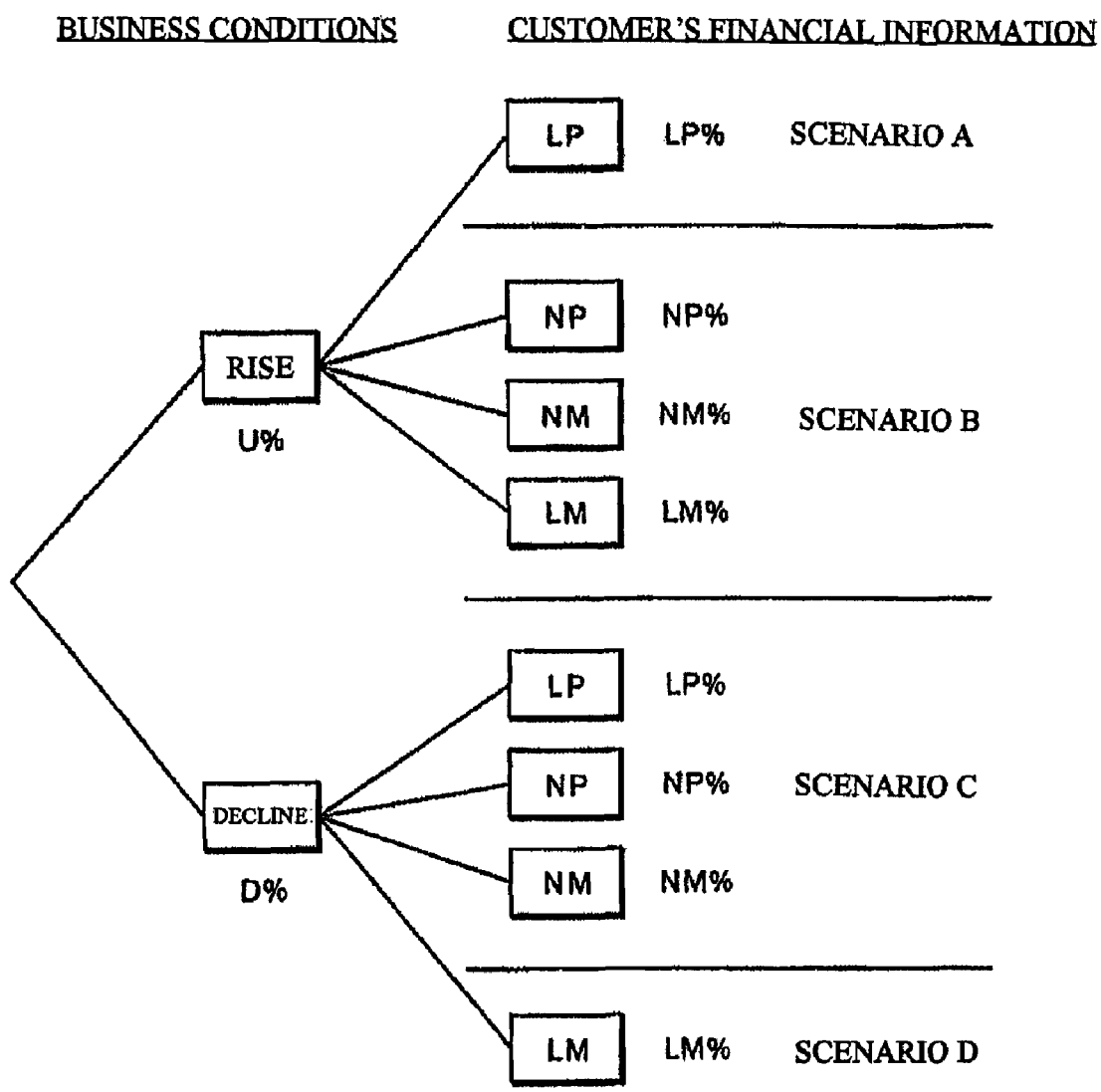

[Figure 4]
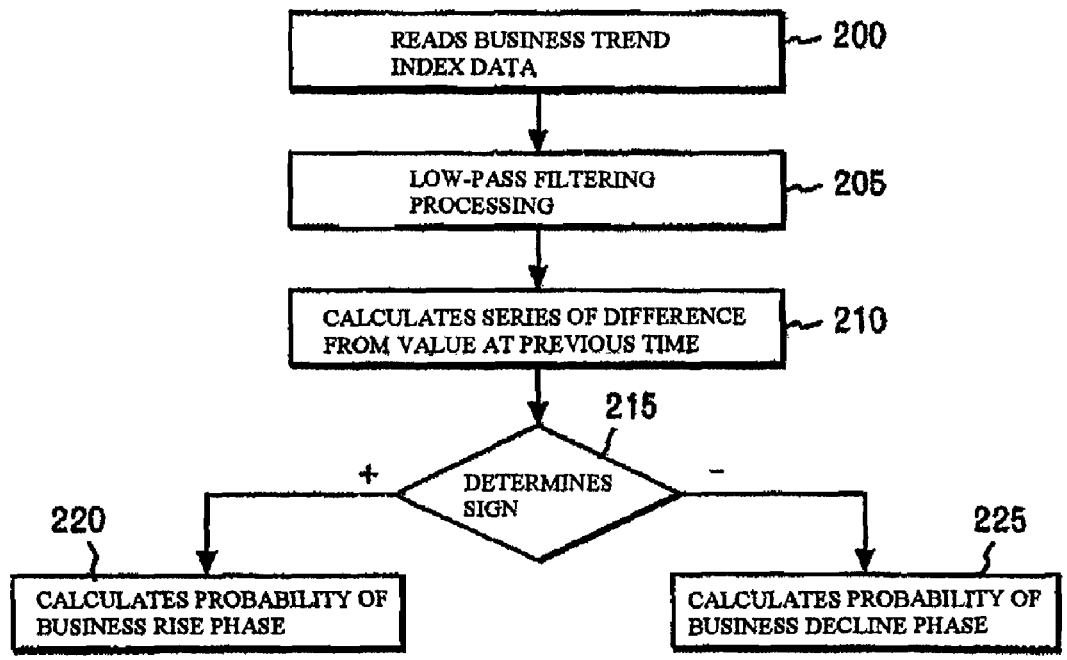
[Figure 5]
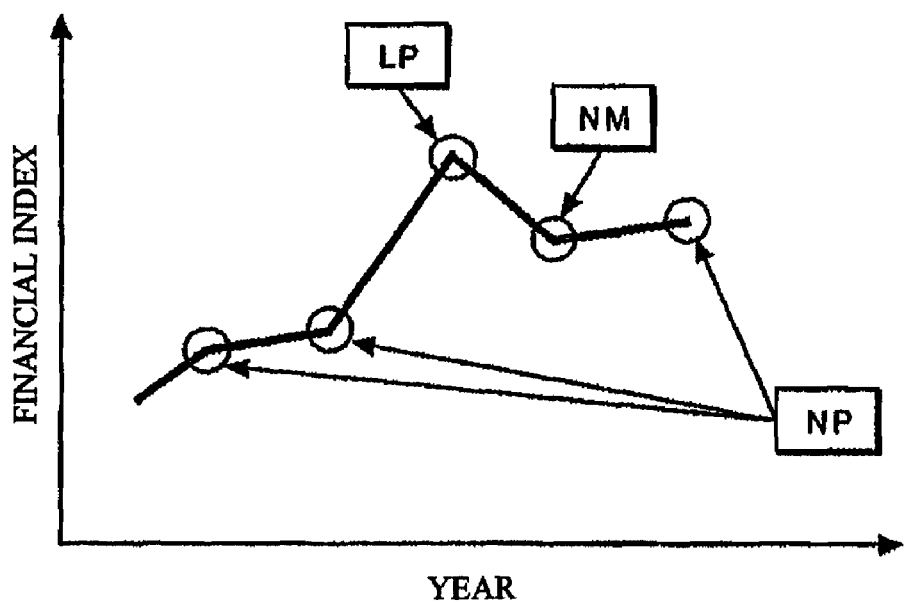

[Figure 6]

| ITEM | DETAILS 1 | DETAILS 2 | REDUCTION RATE OF SCENARIO A | REDUCTION RATE OF SCENARIO A | REDUCTION RATE OF SCENARIO A | REDUCTION RATE OF SCENARIO A | REDUCTION RATE OF ITEM |
|---|---|---|---|---|---|---|---|
| OFFICE SUPPLIES | SHEET | XXX PAPER 1 | a% | ⋮ | ⋮ | ⋮ | AVERAGE REDUCTION RATE OF SAMPLED DETAILED ITEMS ON THE LEFT IS OBTAINED FOR EACH SCENARIO |
| OFFICE SUPPLIES | SHEET | XXX PAPER 2 | b% | ⋮ | ⋮ | ⋮ | |
| OFFICE SUPPLIES | SHEET | XXX PAPER 3 | c% | ⋮ | ⋮ | ⋮ | |
| OFFICE SUPPLIES | FURNITURE AND FIXTURES | YYY FILE 1 | d% | ⋮ | ⋮ | ⋮ | |
| OFFICE SUPPLIES | FURNITURE AND FIXTURES | YYY FILE 2 | e% | ⋮ | ⋮ | ⋮ | |
| OFFICE SUPPLIES | TONER | ZZZ CARTRIDGE 1 | f% | ⋮ | ⋮ | ⋮ | |
| OFFICE SUPPLIES | | | g% | ⋮ | ⋮ | ⋮ | ⋮ |
| PRINTED MATTER | ... | ... | ... | ... | ... | ... | ... |

[Figure 7]

| ITEM | CURRENT TOTAL AMOUNT OF PROCUREMENT | CURRENT NUMBER OF UNITS | PRICE REDUCTION RATE FOR EACH SCENARIO | FLUCTUATION OF THE NUMBER OF UNITS FOR EACH SCENARIO | ESTIMATED REDUCTION AMOUNT FOR EACH SCENARIO | TOTAL REDUCTION OF SCENARIO A | TOTAL REDUCTION OF SCENARIO B | TOTAL REDUCTION OF SCENARIO C | TOTAL REDUCTION OF SCENARIO D |
|---|---|---|---|---|---|---|---|---|---|
| OFFICE SUPPLIES | ¥P1 | U1 UNIT | REDUCTION RATE FOR EACH SCENARIO DETERMINED IN THE RIGHTMOST FIELD IN FIGURE 6 | SCENARIO A → NU1 UNIT, SCENARIO B → NU2 UNITS | VALUE OBTAINED BY APPLYING REDUCTION RATE TO CURRENT TOTAL AMOUNT OF PRICES AND MULTIPLYING IT BY FLUCTUATION OF THE NUMBER OF UNITS | RA | RB | RC | RD |
| PRINTED MATTER | ¥P2 | U2 UNITS | ... | ... | ... | | | | |

[Figure 8]
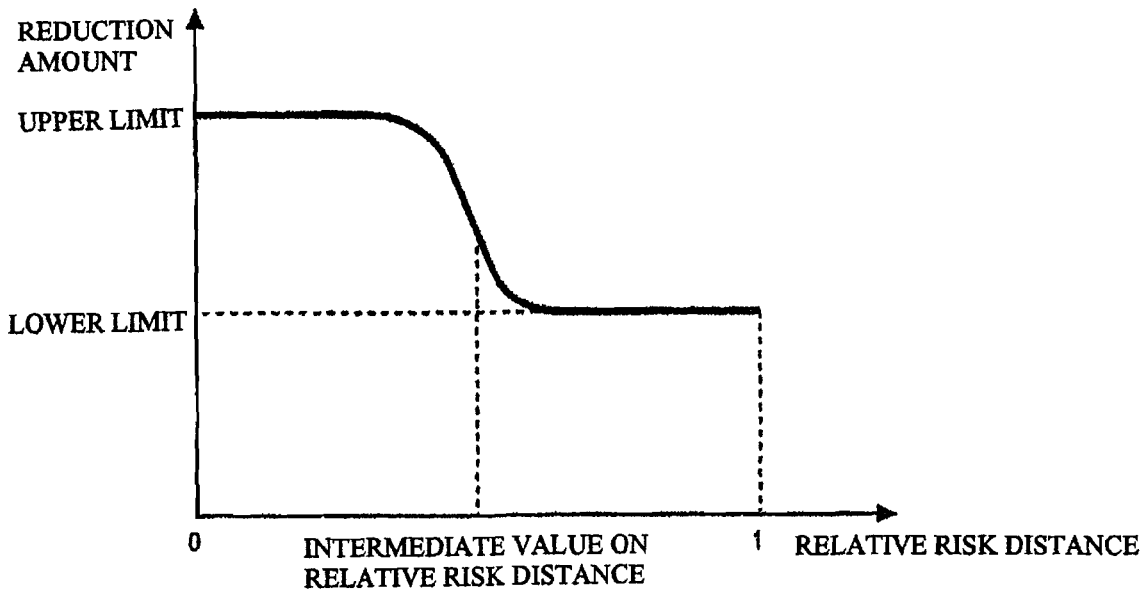
[Figure 9]

[Figure 10]
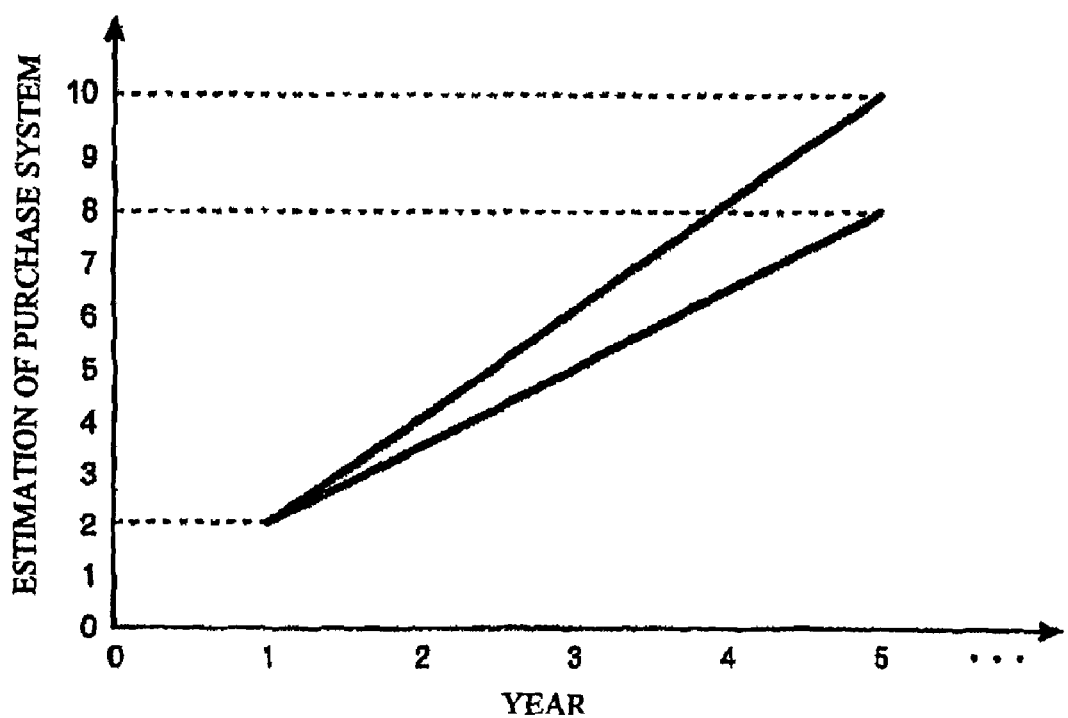

[Figure 11]

| | START YEAR | 1ST YEAR | | | | 2ND YEAR | 3RD YEAR |
|---|---|---|---|---|---|---|---|
| PURCHASE EXPENDITURE IN SCENARIO A | ¥1,000 | ¥950 | | | | ¥903 | ¥857 |
| PURCHASE EXPENDITURE IN SCENARIO B | | ¥960 | | | | ¥912 | ¥866 |
| PURCHASE EXPENDITURE IN SCENARIO C | | ¥970 | | | | ¥922 | ¥875 |
| PURCHASE EXPENDITURE IN SCENARIO D | | ¥980 | | | | ¥931 | ¥884 |
| EXPENDITURE DUE TO CUSTOMER'S EFFORTS | | ¥990 | | | | ¥980 | ¥970 |
| WEIGHTED MEAN OF CONTRIBUTION RATE | | C1 | | | | C2 | C3 |
| IMPROVEMENT RATE FOR EACH SCENARIO | | L2A | L2B | L2C | L2D | ... | ... |
| TRANSFORMATION CONTRIBUTION RATE FOR EACH SCENARIO | | T2A | T2B | T2C | T2D | ... | ... |
| WEIGHTED MEAN OF TRANSFORMATION COMPENSATION RATE | | T1 | | | | T2 | T3 |
| SHARE RATE FOR EACH YEAR | | SR1=C1×T1 | | | | SR2=C2×T2 | SR3=C3×T3 |
| SHARE RATE | | | | | | | |
| VARIABLE COMPENSATION | | KPI ACHIEVEMENT AMOUNT × SR | | | | ... | ... |

[Figure 12]
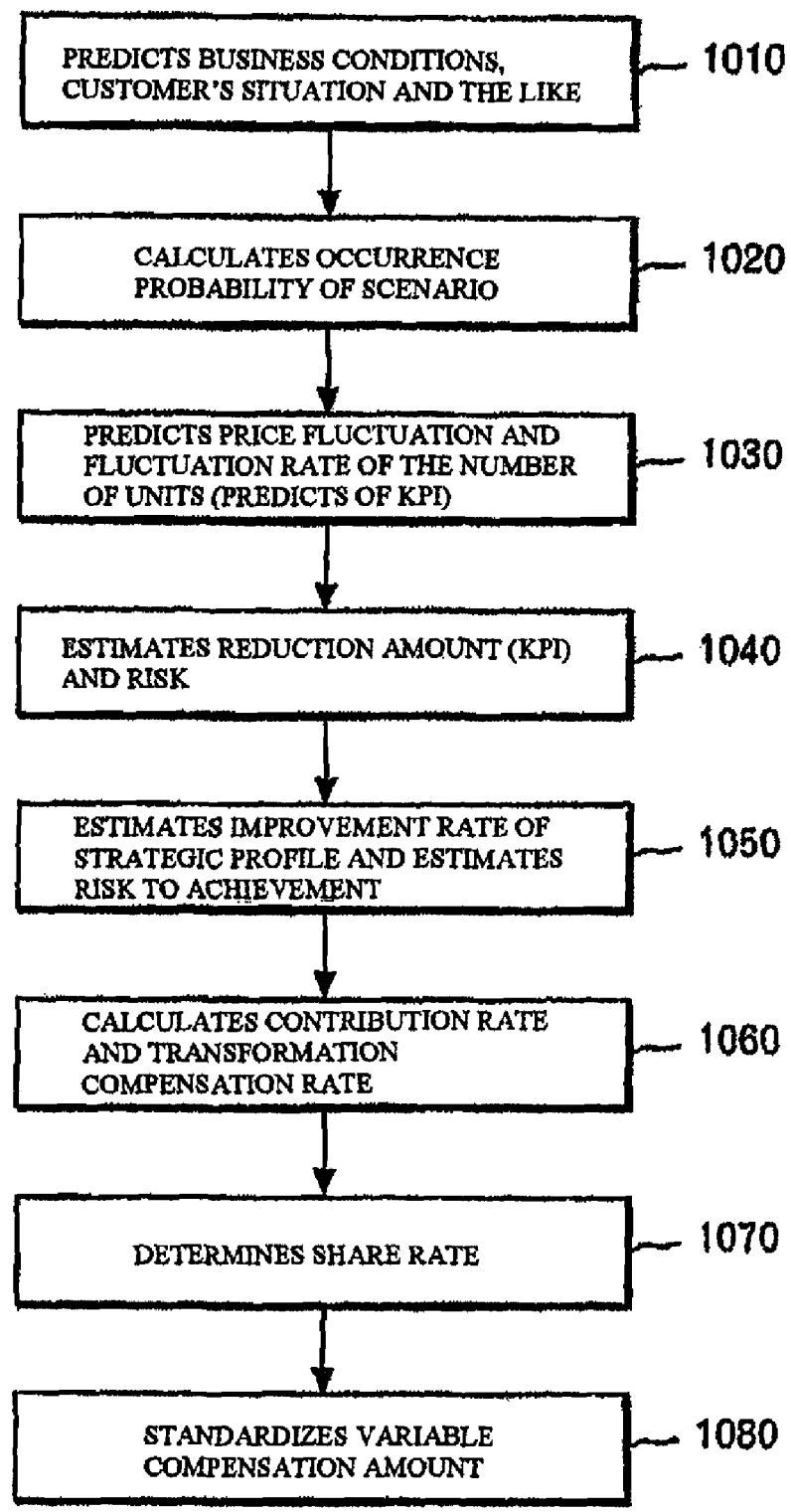

COMPUTER PROGRAM FOR SUPPORTING EVALUATION OF A SERVICE

BACKGROUND OF THE INVENTION

1. Field of the Invention

The present invention relates to a technique for supporting evaluation of a service, and in particular to a technique for supporting quantitative evaluation of the value of a service to be performed before providing the service.

2. Description of the Related Art

Conventionally, the compensation paid for a service or a solution for realizing the service is often calculated by accumulation of costs based on the number of required workers, a contract period and the like. If the outcome is based on a template, the calculation of accumulation of costs may be appropriate. Recently, however, there is a demand for various solutions according to clients, and the outcome is not always based on a template. Therefore, there is an increase in the need to determine compensation corresponding to the value of a delivered solution based on a metric index agreed with a client. As prior-art techniques related thereto, some techniques have been already disclosed from a viewpoint of estimation of value. For example, a method of estimating the value of an information system is disclosed in Patent Document 1 and the like.

[Patent document 1]: Published Unexamined Patent Application No. 2001-265908

However, in such conventional estimation approaches, the value of an information system or the like is quantified based on estimation after the implementation in most cases, and it is difficult to apply the approaches to calculation of a compensation rate to be determined in advance.

The present invention has been made in consideration of the above technical problem. Its object is to provide a technique for supporting estimation which avoids over-evaluation or under-evaluation of value, by quantitatively estimating the value delivered by a solution provider in advance and taking into account risk to achievement thereof. Furthermore, a system for compensation according to the outcome of a solution is being introduced, and another object of the present invention is to provide a technique for calculating a compensation rate in advance in consideration of risk.

BRIEF SUMMARY OF THE INVENTION

The present invention is a method to be applied to a system for supporting advance evaluation of a service for improving business, the method comprising: accepting selection of an index indicating the degree of improvement of the business; accepting setting of multiple future scenarios which influence success/failure of the improvement of the business; calculating a primary estimate value of the index in the case of occurrence of each scenario; and calculating a secondary estimate value based on the primary estimate value and a primary risk corresponding to the primary estimate value.

The present invention is also a system for supporting advance evaluation of a service for improving business, comprising: input means for accepting selection of an index indicating the degree of improvement of the business and accepting setting of multiple future scenarios which influences success/failure of the improvement of the business; calculation means for calculating a primary estimate value of the index in the case of occurrence of each scenario and calculating a secondary estimate value based on the primary estimate value and a primary risk corresponding to the primary estimate value.

Furthermore, the present invention is a computer program for causing a computer to function as a system for supporting advance evaluation of a service for improving business, the computer program causing the computer to execute: an input function of accepting selection of an index indicating the degree of improvement of the business and accepting setting of multiple future scenarios which influences success/failure of the improvement of the business; a calculation function of calculating a primary estimate value of the index in the case of occurrence of each scenario and calculating a secondary estimate value based on the primary estimate value and a primary risk corresponding to the primary estimate value.

The following are enumeration of characteristic items of the present inventions.

1. To estimate the value of a solution in advance by stochastically predicting fluctuation of KPI based on occurrence probabilities of multiple scenarios and reflecting a quantified value of risk to achievement on a predicted KPI value.
2. To have the risk measured by a metric distance between vectors constituted by KPI elements, perform risk evaluation with a logistic function using the metric distance, the KPI variable and a statistic value about it, and increase/decrease the KPI variable based on the metric distance, in the risk-to-achievement calculation process.
3. To estimate indirect factors which may significantly influence the value of the solution based on the occurrence probabilities of the multiple scenarios by strategically predicting yearly change in a transformation achievement profile and considering a quantified value of risk to achievement depending on the predicted change as a system-improvement rate.
4. To have the risk measured by a metric distance between vectors constituted by an as-is value and a to-be value of the profile, estimate the rate of change in the metric distance by a sigmoid function, and estimate the rate of involvement in the transformation, in the risk-to-achievement calculation process.
5. To calculate a contribution rate based on the fluctuation rate of KPI, and estimate a share rate of an achieved outcome in advance by considering the rate of involvement in the transformation.
6. To determine a variable compensation amount by combining KPI variable values of the multiple scenarios with the share rate determined in advance.

According to the present invention, it is possible to quantitatively evaluate the value of a solution at the stage of a contract, determine an appropriate variable compensation rate in advance, and provide a compensation contract with higher transparency for a client.

BRIEF DESCRIPTION OF THE SEVERAL VIEWS OF THE DRAWINGS

FIG. 1 shows an example of configuration of a system;

FIG. 2 is a block diagram of the system in FIG. 1;

FIG. 3 shows an example of configuration of a scenario;

FIG. 4 shows an example of business conditions determination processing;

FIG. 5 shows an example of estimation of the occurrence probability of a client's financial situation;

FIG. 6 shows an example of estimation of a reduction rate considering price fluctuation;

FIG. 7 shows an example of the result of estimation of a tentative reduction amount of procurement cost;

FIG. 8 is a conceptual diagram of consideration of risk to a reduction amount;

FIG. 9 shows an example of interannual improvement of a strategic profile;

FIG. 10 shows an example of interannual of a profile;

FIG. 11 shows an example of relation between a reduction amount and a share rate; and FIG. 12 shows the entire flow of a method for determining variable compensation based on KPI.

DETAILED DESCRIPTION OF THE INVENTION

As an embodiment, consideration will be made on a system for determining the value to be brought about by a transformation solution (service) related to an indirect material procurement system and process and a variable compensation amount therefor.

FIG. 1 is an external view of a computer (system) 1 according to the embodiment.

FIG. 2 is a schematic diagram illustrating the hardware configuration of the computer 1 in FIG. 1.

The computer 1 is provided with a CPU peripheral part having a CPU 101, a RAM 120 and a graphic controller 146 which are mutually connected via a host controller 110; an input/output part having a communication interface 144, a hard disk drive (auxiliary storage device) 124 and a CD-ROM drive 126 which are connected to the host controller 110 via an input/output controller 140; and a legacy input/output part having a ROM 122, an input/output chip 142, a flexible disk drive 128 and the like which are connected to the input/output controller 140.

The host controller 110 connects the RAM 120 to the CPU 101 and the graphic controller 146 which access the RAM 120 at a high transfer rate. The CPU 101 operates based on programs stored in the ROM 122 and the RAM 120 to control each part. The graphic controller 146 acquires image data generated by the CPU 101 or the like on a frame buffer provided in the RAM 120, and displays it on a display device 148. Alternatively, the graphic controller 146 may include the frame buffer for storing image data generated by the CPU 101 and the like, inside it.

The input/output controller 140 connects the host controller 110 to the communication interface 144, the hard disk drive 124 and the CD-ROM drive 126 which are relatively high speed input/output devices. The communication interface 144 communicates with other apparatuses via a network. The hard disk drive 124 stores programs and data to be used by the computer 1. The CD-ROM drive 126 reads a program or data from a CD-ROM 130 and provides it to the input/output chip 142 via the RAM 120.

The ROM 122, the input/output chip 142 and a relatively low speed input/output device (for example, the flexible disk drive 128) are connected to the input/output controller 140. The ROM 122 stores a boot program, which is executed by the CPU 101 when the computer 1 is activated, and programs dependent on the hardware of the computer 1. The flexible disk drive 128 reads a program or data from a flexible disk 132 and provides it to the input/output chip 142 via the RAM 120. The input/output chip 142 connects the flexible disk drive 128 or connects various input/output devices, for example, via a parallel port, a serial port, a keyboard port, a mouse port or the like.

Next, the software configuration of the computer 1 will be described. Computer programs to be provided for the computer 1 are provided by being stored in a recording medium such as the flexible disk 132, the CD-ROM 130 and an IC card or via a network. The programs are read from the storage medium and installed in the computer 1 via the input/output chip 142 or read from another computer on the network and installed in the computer 1 via the communication interface 144 and then executed.

Here, a reduction amount of an indirect material procurement cost (hereinafter referred to as a purchase cost) is set as a key performance indicator (hereinafter referred to as a KPI) for the above-mentioned transformation solution. For each of modules constituting a system for quantitatively evaluating the probability and risk to achievement of the KPI, input/output data and a processing device will be described below. Only one kind of KPI is assumed in this embodiment. However, in general, there are multiple KPI's, and each KPI can be further broken down into more detailed indicators. These are expressed by a tree structure referred to as a value tree. The approach and the apparatus of this embodiment can be applied to each factor constituting such a value tree, and can also be applied to a value driver, an especially influential factor selected from among the factors.

Because the reduction amount of the indirect material procurement cost depends on business conditions or a client's future situation, multiple assumable scenarios are conceived, and the reduction amount and the like are estimated based on the occurrence probability of each scenario. Accordingly, the occurrence probability of each scenario is determined first. The scenarios are assumed to be constituted by four scenarios A, B, C and D, which are arranged from the best to the worst in that order. It is assumed that each scenario consists of a combination of business conditions and the client's financial situation, as shown in FIG. 3.

As for business conditions, it is possible to predict the future trend with the use of statistical data announced by the administrative authority or the central bank. Here, however, it is assumed that the probability of phase appearance in the business trend data for the past several years can be similarly applied in the future. Various approaches for determining the business rise/decline phase from the business conditions data for the past several years are conceivable. Here, an approach is used in which business trend index data is read (200); a series from which short-period fluctuation components have been removed is generated by performing low-pass filtering (205); difference between them is calculated (210); it is determined whether the result value is positive or negative (215); an rise phase is determined if the result value is positive (220); and a decline phase is determined if the result value is negative (225), as shown in FIG. 4. However, the approach is not limited thereto.

Furthermore, as for the client's future performance situation, an appropriate index is selected from officially announced financial data, and estimation of a model and prediction of the future are performed for the index. Generally, Kalman filter-based prediction is performed with state space modeling of financial data. Here, however, an approach is used in which time-varying auto-regressive (hereinafter referred to as time-varying AR) modeling of a difference series of sales data is performed, and future values are sequentially estimated from the result of performing parameter estimation by a weighted recursive least squares method (hereinafter referred to as a weighted RLS method). Then, the increase/decrease rate of a yearly predicted value obtained as shown in FIG. 5 is regarded as the occurrence probability of a scenario of the client's future financial situation. For example, on the assumption that a threshold is denoted by T, if the increased amount compared to the previous year exceeds T and is significantly positive (LP in FIG. 3), then scenario A is considered to occur. If the increased amount compared to the previous year is T or below and is positive (NP in FIG. 3), then the scenario B is considered to occur. On the contrary, if the increased amount compared to the previous year exceeds −T and is significantly negative (LM in FIG. 3), then the scenario D is considered to occur. If the increased amount compared to the previous year is larger than −T but is negative (NM in FIG. 3), then the scenario C is considered to occur. In this way, the occurrence probability of each scenario is determined. If there is not an appropriate scenario (LM in the example of FIG. 5), then the probability corresponding to 1.0% is given from the closest scenario (given from NM in the example of FIG. 5).

By synthesizing the probabilities in accordance with the structure shown in FIG. 3, the occurrence probabilities of the four scenarios can be determined. In the case of FIG. 3, the occurrence probabilities are determined as follows:

Probability of the scenario $A=(U\times LP)\%$;

Probability of the scenario $B=(U\times(NP+NM+LM))\%$;

Probability of the scenario $C=(D\times(LP+NP+NM))\%$; and

Probability of the scenario $D=(D\times LM)\%$.

Selection of the financial index can be arbitrarily performed. It is also possible to adopt a method in which multiple factors constituting financial data series is extracted by a signal-processing approach shown in U.S. Pat. No. 3,725,418 disclosed by one of the inventor et al., and an index which makes behavior resembling the extracted data having the strongest influence is selected from among them. In addition, it is also possible to incorporate financial situations of other competitors into the factors of scenarios with the use of an approach similar to prediction of the client's financial situation. However, since this is within the range of approaches that one skilled in the art would easily assume, it will be omitted here.

Next, for each of the scenarios obtained as described above, the reduction amount of procurement cost, that is, the KPI achievement amount is estimated. The reduction amount is estimated based on current values by estimating price fluctuation and fluctuation of the number of units of items to be purchased. First, the price fluctuation range of items to be purchased (shown in the item fields in FIG. 6) is predicted. As data information to be used for the prediction, the client's current procurement price and a target procurement price after transformation of target items which have been appropriately sampled (shown in the field of details 2 in FIG. 6) are used.

First, it is assumed that price fluctuation can be expressed by an autoregressive moving average (herein after referred to as ARMA) model using the business indexes of the past several years as input and the price index of target items as output. That is, it is assumed that the prices of the target items are determined by an autoregressive component of the past prices and a moving average component of business conditions, and that error variance $\sigma^2$ at the time of prediction indicates the power of the business index at that time. When the ARMA model estimation is performed, various approaches are conceivable, for example, an approach in which estimation is made after setting the average value of respective data to zero or normalizing the variance or an approach in which estimation of parameters is performed with the use of difference values among the data. The approach is not limited to these. As for the approach of parameter estimation, though it is common to perform the estimation with the use of a weighted RLS method in consideration of the time-varying nature of the model, it is possible to use other similar parameter estimation approaches, and the approach is also not limited to any approach.

Furthermore, it is fluctuation of price difference that is required for prediction of KPI. The square root of the error variance determined above is regarded as price fluctuation deviation $\sigma$, and this is reflected on the current price difference p according to the scenarios. For example, in the case of the scenario A, it is assumed that the input power into the above ARMA model significantly increases, and that the price difference increases as shown by $p-2\sigma_p$. On the contrary, in the scenario D, it is assumed that the price difference decreases or the price levels are reversed, like $p+2\sigma_p$. Such an estimated value is calculated for each item, and the reduction rate for each scenario in FIG. 6 is calculated for each of the details. Here, $\sigma_p$ indicates that $\sigma$ is varied according to the price difference p which is different for each item. The coefficient varies according to the scenarios, and multiplication by 2 is not limited.

In this way, it is possible to compare the case where the client continues procurement for himself and the case where the solution is applied. Thereby, it is possible to determine the reduction rate in the case of applying the solution, for each item, by averaging the reduction rates of the details of each item.

Here, the number of items to be sampled is not limited. If price history data of details of purchased items exists, it is possible to predict a price fluctuation scenario by replacing the price index used in the above ARMA modeling with the data. In this case, fluctuation deviation for each item can be determined from actual data, for example, by clustering the history data based on the business trend shown when the data was recorded. Therefore, an estimated value of price difference for each scenario can be directly determined from the data without assuming price fluctuation deviation. Of course, even in such a case, the embodiment described below can be applied.

Furthermore, the fluctuation range of the number of units of the items to be purchased is predicted. As data information used for the prediction, the number of units for each item currently used by the client and the client's officially announced financial data are used. For example, if such correlation exists in the client's procurement system that the quantity of required indirect material increases as the future sales increases relative to the current sales, then it is possible to estimate a fluctuation range by predicting the sales from the financial data and increasing/decreasing the future fluctuation of the number of units in proportion to the predicated value. The future value of the financial data can be predicted by performing time-varying AR modeling of difference among yearly data or by performing state space modeling of the yearly data itself. The approach is not limited.

Thereby, it is possible to estimate a tentative reduction amount based on price fluctuation and fluctuation of the number of units when KPI is set as the reduction amount of procurement cost, as shown in FIG. 7. If the reduction amounts of the scenarios A to D are RA, RB, RC and RD, respectively, an average rate RM of the reduction amounts and a standard deviation $\sigma_R$ can be determined. Actually, however, it is common that, risk to realization increases as the difference between the current and estimated values increases. The present invention also considers this quantitatively, and the approach therefor will be described below.

Now, a group of total amounts of current procurement prices for respective items (the second column in FIG. 7) is assumed to be a vector a, and a group of prices from which estimated reduction has been made (the sixth column in FIG. 7) is assumed to be vector b. Here, the distance between the vectors a and b is measured by the following formula.

Distance=(average value of vector $b$−average value of vector $a$)$^2$/variance of vector $a$ This is a formula for approximating a Mahalanobis distance by a small number of samples. For example, in the case of causing 100 in the vector a to be 99 in the vector b for a certain item, and in the case of causing 40 in the vector a to 39 in the vector b for another item, it is possible to make difference between them as distances by the above formula. Therefore, this formula is more suitable for estimation of risk than the case of considering simple difference. The reduction amount in consideration of risk to achievement based on this distance is determined as described below.

Distances obtained by relativizing the distances DA, DB, DC and DD for the respective scenarios so that the sum of them is 1 are denoted by DAd, DBd, DCd and DDd.

The upper limit of the reduction amount in the respective scenario is assumed to be $Ri+Did \times \sigma_{Ri}$ (i=A, B, C, D), and the lower limit is assumed to be $Ri-Did \times \sigma_{Ri}$ (i=A, B, C, D). The $\sigma_{Ri}$ indicates a value obtained by multiplying the standard deviation $\sigma R$ of the reduction amount by Ri/RM according to the reduction amount of the respective scenarios.

For each scenario, a logistic function is considered:

$$L1 = \text{upper limit}/(1+\beta \exp(-\alpha/D))$$

Then, parameters $\alpha$ and $\beta$ are determined so that L1=lower limit when D=1, and L1=(intermediate value between upper limit and lower limit) when D=(intermediate value on [DAd DBd DCd DDd]).

The reduction amount considering risk to achievement of reduction is determined by substituting Did of each scenario for D.

Through the above procedure, the reduction amount which is relatively smaller than the tentative reduction amount is finally estimated when the risk distance is large, and the reduction amount which is relatively larger than the tentative reduction amount is finally estimated when the risk distance is small, as shown in FIG. 8.

However, in the above derivation of the reduction amount, it is assumed that the procurement system or process is in a situation close to an ideal situation, but, at the initial stage of implementation of the solution, the situation at the client's is not necessarily the ideal situation. Therefore, it is necessary to strategically consider a profile about to what degree the process or rules, and the governance over the entire purchase should be transformed. Specifically, it means consideration of strategy weighting, for example, consideration of raising the current level 2 of the degree of centralized procurement and the thoroughness of rules to the maximum level 10 and the level 8, respectively. Thus, as for such factors as may significantly influence KPI indirectly, it is necessary to quantify the risk to achievement and the influence on the reduction amount (KPI).

First, as a method for incorporation into the reduction amount, a method is conceivable in which the above lower limit is shown at the stage where the level is low, and then, transformation for improvement of the level is linearly promoted during a contract period as shown in FIG. 10, and the reduction amount is corrected so that it comes close to the estimate value of the reduction amount considering risk. It is simply an example that the level changes linearly, and it is also possible to assume some function in advance.

By appropriately combining and using the results of the modules described above, it is possible to estimate the distribution of the reduction amount of procurement cost, which is KPI, as shown in the upper four lines in FIG. 11.

Next, description will be made on an approach for determining a compensation amount based on KPI expected to be achieved. Here, the compensation is determined based on the rate of contribution to achievement of the transformation described above. First, the contribution rate is defined as the improvement rate of KPI. Since KPI is a reduction amount in this embodiment, the contribution rate can be calculated for each year for each scenario.

Contribution rate=(reduction rate(or reduction amount)due to implementation of solution−reduction rate(or reduction amount)due to only client's efforts)/reduction rate(or reduction amount)due to implementation of solution Then, a value weighted by the occurrence probability of a scenario (for example, C1 in FIG. 11) is regarded as an estimated value of the contribution rate for the year. In this case, an amount or a rate estimated by the client as an efficiency target or the like in advance is used as the "reduction rate due to only client's efforts". In the case where there are multiple KPI's which are mutually related as described first, the following expressions are used.

First expression: $x(t+1)=A^*x(t)+v(t)$

Second expression: $y(t)=C^*x(t)+D^*u(t)+w(t)$

In this state space model, a factor due to contribution by the solution is indicated by x(t); an effect factor due to only the client's efforts is indicated by u(t); a KPI observation vector is indicated by y(t); and an external macro factor such as an economic situation modeled by white noise is denoted by v(t) and w(t). By indicating a model in which x(t) interannually changes by the first expression and estimating a model coefficient matrix of the second expression, the contribution rate can be calculated as $\|C\|/(\|C\|+\|D\|)$ with the use of a matrix norm. With the use of a subspace approach or the like in a system identification, the coefficient matrix of the above expression can be estimated, and the details are omitted. However, it is assumed that x and u have been normalized.

When this is applied to the example described above, A=I (unit matrix) and v=w=0. If x and u have been normalized, the object can be achieved by the above contribution rate calculation without using a system identification approach.

Because this contribution rate assumes that the client purchases required indirect material, it is difficult to regard a part of the KPI achievement amount corresponding to the contribution rate as the compensation. Therefore, it is considered to determine, in the contribution rate, a compensation share rate based on the rate of transformation lead by the solution provider side. Therefore, the improvement rate is defined as the transformation rate with the use of the strategic profile level described before, and the compensation rate is determined in consideration of risk which may occur before reaching the level. Thus, the share rate can be calculated by multiplying the contribution rate by the compensation rate. A concrete procedure for determining the compensation rate is as shown below.

Now, a group of evaluation scores of the current procurement system (the first column in FIG. 9) is assumed to be a vector c, and a group of strategic profiles (group of profiles for which the final achievement level has been lowered according to the second column in FIG. 7 and the scenario) supposed to be finally reached in each scenario is assumed to be a vector d. The value of d changes according to years. As for the interannual change of the profile, it is assumed that the strategic profile level is linearly improved from the current situation to the target profile. A distance Pi between the vector c and the vector d is calculated for each scenario by the following formula.

Distance=(average of vector $d$−average of vector $c$)$^2$/variance of vector $c$ A relative distance Pid is calculated so that the sum of Pi's of the respective scenarios is 1. In this case, i=A, B, C and D.

An improvement rate IRi is determined from an average score Ii of the respective scenario for the respective years, and an average improvement rate IM of the four scenarios and its deviation $\sigma_I$ are determined.

The upper limit of the improvement rate in the respective scenarios is assumed to be Ii+Pid×$\sigma_{I_i}$, and the lower limit is assumed to be Ii−Pid×$\sigma_{I_i}$ (i=A, B, C, D). The $\sigma_{I_i}$ indicates a value obtained by multiplying the standard deviation $\sigma_I$ of the reduction amount by IRi/IM according to the reduction amount of the respective scenario.

For each scenario, a logistic function is considered:

$$L2 = \text{upper limit}/(1+\delta\exp(-\gamma/P))$$

Then, parameters γ and δ are determined so that L2=lower limit when P=1, and L2=(intermediate value between upper limit and lower limit) when P=(intermediate value on [DAd DBd DCd DDd]).

The improvement rate considering risk to achievement of profile transformation is determined by substituting Pid of each scenario for P of L2.

A sigmoid function is used in order to map the rate of change of this improvement rate to the probability. For example, in the case of five-stage evaluation scores, the function indicated by the following is considered so that the value is 0.5 when the grade is 3.

$$\text{Evaluation function} = 1/(1+\exp(\text{average score}-3))$$

Accordingly, the rate to be compensation for the yearly transformation can be determined from the following formula.

$$\text{Transformation contribution rate} = 1/(1+\exp(\text{current average score}-3)) - 1/(1+\exp(L2 \times \text{current average score}-3))$$

By the above processing flow, predicted values of the contribution rate and the compensation rate for each year are estimated. A value obtained by multiplying their weighted means is regarded as the share rate of the variable compensation for each year (the eleventh line in FIG. 11). Because it is necessary to determine the share rate in advance in an actual contract, the average of these estimated values (the twelfth line in FIG. 11) is regarded as the share rate of KPI.

By using the result of the calculation system described above, it is possible to perform simulation for making decisions about a contract of a solution suitable for a client, such as decisions on what variable compensation form is to be taken and which year is to be used as the reference year for KPI metric. For example, combination of the scenarios can be changed, such as a combination of the scenarios A, B and A for the first, second and third years, respectively, or comparison of NPV's in consideration of the occurrence probability of the scenarios can be performed.

It is also conceivable to combine means for making decisions about whether variable compensation should be selected or not, at the initial stage of the client's decision making. Specifically, such means is possible that whether or not to select variable compensation is determined by Analytic Hierarchy Process (AHP) by having the client answer multiple questions prepared by the solution provider side. However, one skilled in the art can think of other approaches as specific initial decision-making means, and therefore, the means is not limited in detail.

The entire flow of the method for determining variable compensation based on KPI can be expressed as shown in FIG. 12, as a summary of the above description,

What is claimed is:

1. A system for supporting prior evaluation of a service for improving business, comprising:
   a bus;
   a communications unit connected to the bus;
   a computer readable storage device connected to the bus;
   a processor unit connected to the bus and to a computer readable memory;
   input means, stored in the computer readable storage device for execution by the processor unit via the computer readable memory, for accepting selection of an index comprising a historical record of business trend data useable for indicating a degree of improvement of the business and accepting setting of multiple future scenarios which influence success/failure of improvement of the business, wherein each scenario at least comprises a set of business conditions and a financial situation of the business;
   storage means for storing the index and the multiple future scenarios;
   calculation means, stored in the computer readable storage device for execution by the processor unit via the computer readable memory, for calculating a first estimate value of the index for occurrence of each scenario of the multiple future scenarios, wherein the first estimate value is determined by processing the historical record of business trend data with a statistical filtering technique to calculate an occurrence probability of each scenario and calculating a second estimate value based on the first estimate value and a first risk to achievement of a first business improvement corresponding to the first estimate value;
   wherein the business includes multiple business elements; and
   wherein the statistical filtering technique is performed using low-pass filtering or Kalman filter-based prediction; and
   the calculation means calculates a first vector having the multiple business elements before achievement of the first business improvement as vector components and a second vector having the multiple business elements after achievement of the first business improvement as vector components; and
   the calculation means calculates the first risk to achievement of the first business improvement as a first metric distance between the first vector and the second vector; and
   the calculation means calculates a first reduction amount corresponding to the risk to achievement of the first business improvement from the first metric distance, the first estimate value and a logistic function obtained from the first estimate value; and
   the calculation means calculates the second estimate value by subtracting the first reduction amount from the first estimate value.

2. The system according to claim 1, wherein
   the service is a service for a second organization improving business of a first organization;
   the input means accepts setting for future improvement of an ability of the first organization which influences success/failure of improvement of the business;
   the storage means stores improvement of the ability; and
   the calculation means calculates a predicted value of the improvement of the ability in a case of an occurrence of each scenario, and calculates a third estimate value based on the second estimate value and a second risk to achievement of a second business improvement corresponding to the predicted value.

3. The system according to claim 2, wherein
the ability includes multiple ability elements; and
the calculation means calculates a third vector having the multiple ability elements before achievement of the second business improvement as vector components and a fourth vector having the multiple ability elements after achievement of the second business improvement as vector components; and
the calculation means calculates the second risk to achievement of the second business improvement as a second metric distance between the third vector and the fourth vector; and
the calculation means calculates a second reduction amount corresponding to the risk to improvement from the second metric distance, the predicted value and a logistic function obtained from the predicted value; and
the calculation means calculates the third estimate value by subtracting the second reduction amount from the second estimate value.

4. The system according to claim 3, wherein
the calculation means calculates a rate of change of the second metric distance based on the second metric distance and a predetermined evaluation function, and calculates a share rate of the second organization by multiplying the rate of change of the index by the rate of change of the second metric distance.

5. The system according to claim 4, wherein the calculation means calculates the occurrence probability of each scenario, calculates an expected value of the index from the occurrence probability and the third estimate value, and calculates a compensation for the service to the second organization by multiplying the expected value by the share rate.

6. The system according to claim 5, further comprising output means for outputting the compensation.

7. A computer program product for supporting advance evaluation of a service for improving a business comprising:
one or more computer-readable, tangible storage device;
computer program instructions stored on at least one of the one or more computer-readable, tangible storage devices to accept selection of an index comprising a historical record of business trend data useable for indicating a degree of improvement of the business and accepting setting of multiple future scenarios which influence success/failure of improvement of the business, wherein each scenario at least comprises a set of business conditions and a financial situation of the business;
computer program instructions stored on at least one of the one or more computer-readable, tangible storage devices to store the index and the multiple future scenarios; and
computer program instructions stored on at least one of the one or more computer-readable, tangible storage devices to calculate by a calculation means a first estimate value of the index for occurrence of each scenario of the multiple future scenarios, wherein the first estimate value is determined by processing the historical record of business trend data with a statistical filtering technique to calculate an occurrence probability of each scenario;
computer program instructions stored on at least one of the one or more computer-readable, tangible storage devices to calculate by the calculation means a second estimate value based on the first estimate value and a first risk to achievement of a first business improvement corresponding to the first estimate value wherein the business includes multiple business elements; and
wherein the statistical filtering technique is performed using low-pass filtering or Kalman filter-based prediction; and
wherein the calculation means calculates a first vector having the multiple business elements before achievement of the first business improvement as vector components and a second vector having the multiple business elements after achievement of the first business improvement as vector components; and
wherein the calculation means calculates the first risk to achievement of the first business improvement as a first metric distance between the first vector and the second vector; and
wherein the calculation means calculates a first reduction amount corresponding to the risk to achievement of the first business improvement from the first metric distance, the first estimate value and a logistic function obtained from the first estimate value; and
wherein the calculation means calculates the second estimate value by subtracting the first reduction amount from the first estimate value.

8. A method for supporting advance evaluation of a service for improving business, the method comprising:
a computer accepting selection of an index comprising a historical record of business trend data useable for indicating improvement of the business;
the computer accepting setting of multiple future scenarios which influence the index, wherein each scenario at least comprises a set of business conditions and a financial situation of the business;
the computer storing the index and the multiple future scenarios;
the computer calculating, by a calculation means, a first estimate value of the index for occurrence of each scenario of the multiple future scenarios, wherein the first estimate value is determined by processing the historical record of business trend data with a statistical filtering technique to calculate an occurrence probability of each scenario; and
the computer calculating, by the calculation means, a second estimate value based on the first estimate value and a first risk to achievement of a first business improvement corresponding to the first estimate value;
wherein the business includes multiple business elements; and
wherein the statistical filtering technique is performed using low-pass filtering or Kalman filter-based prediction; and
wherein the calculation means calculates a first vector having the multiple business elements before achievement of the first business improvement as vector components and a second vector having the multiple business elements after achievement of the first business improvement as vector components; and
wherein the calculation means calculates the first risk to achievement of the first business improvement as a first metric distance between the first vector and the second vector; and
wherein the calculation means calculates a first reduction amount corresponding to the risk to achievement of the first business improvement from the first metric distance, the first estimate value and a logistic function obtained from the first estimate value; and
wherein the calculation means calculates the second estimate value by subtracting the first reduction amount from the first estimate value.

* * * * *